United States Patent [19]

Bauer et al.

[11] Patent Number: 4,992,513

[45] Date of Patent: Feb. 12, 1991

[54] HIGH MODULUS RUBBER COMPOSITION

[75] Inventors: Richard G. Bauer, Kent; James B. Pyke; Martin P. Cohen, both of Akron, all of Ohio

[73] Assignee: The Goodyear Tire & Rubber Company, Akron, Ohio

[21] Appl. No.: 242,099

[22] Filed: Sep. 9, 1988

[51] Int. Cl.$^5$ .......................... C08L 7/00; C08L 9/00; C08L 9/06; C08L 51/04

[52] U.S. Cl. ..................................... 525/184; 525/182

[58] Field of Search ..................... 525/184, 182, 187

[56] References Cited

U.S. PATENT DOCUMENTS

| | | | |
|---|---|---|---|
| Re. 30,322 | 7/1980 | Hammer | 525/183 |
| 4,535,119 | 8/1985 | Tanibuchi et al. | |
| 4,708,987 | 11/1987 | Hergenrother et al. | |
| 4,755,552 | 7/1988 | Jadamus et al. | 525/184 |
| 4,777,211 | 10/1988 | Lavengood et al. | 525/66 |
| 4,882,382 | 11/1989 | Udipi | 525/184 |

OTHER PUBLICATIONS

Fourth International Conference on Reactive Processing of Polymers, Oct. 29-31, 1986, Gardner Student Center, University of Akron (see especially Hoshino on pp. 22-27).

Patent Abstracts of Japan, vol. 5, No. 156 (C-74) (828), 6th Oct. 1981; & JP-A-56 88 477 (Ube Kosan K.K.), 17-07-1981 (Ueno).

Database WPI, No. 78-85078A/47, Derwent Publications Ltd., London, GB; & JP-A-53 120 762 (Toyobo K.K.), 21-10-1978.

Primary Examiner—Allan M. Lieberman
Attorney, Agent, or Firm—Alvin T. Rockhill

[57] ABSTRACT

It is desirable to increase the modulus of rubbers utilized in a wide variety of applications. This invention discloses a technique for modifying rubbers to improve their modulus without sacrificing other properties. The subject invention more specifically relates to a process for preparing a rubber composition having a high modulus which comprises reacting at least one epoxidized rubber with from about 2 phr to about 55 phr of at least one nylon at a temperature which is within the range of about 140° C. to about 300° C.

23 Claims, No Drawings

HIGH MODULUS RUBBER COMPOSITION

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention discloses a technique for modifying a rubber so as to greatly increase its modulus. This results in the rubber being better suited for applications where a high degree of stiffness is desirable. However, this modification procedure does not generally sacrifice other desirable characteristics of the rubber. For instance, the rubber compositions of this invention have an increased modulus but do not have an increased degree of hysteresis.

The rubber compositions of this invention are prepared by grafting nylon onto the rubber. This is done by epoxidizing the rubber and subsequently allowing the epoxidized rubber to react with amine moieties on the nylon. This procedure grafts polymer chains which are comprised of nylon onto the polymer chains of the rubber.

The subject invention specifically discloses a process for preparing a rubber composition having a high modulus which comprises reacting at least one epoxidized rubber with at least one nylon at a temperature which is within the range of about 140° C. to about 300° C. In most cases from about 2 phr to about 55 phr of nylon will be reacted with the epoxidized rubber.

The subject invention also reveals a process for preparing a rubber modified nylon composition which comprises reacting at least one epoxidized rubber with from about 100 phr to about 5000 phr of at least one nylon at a temperature which is within the range of about 140° C. to about 300° C.

DETAILED DESCRIPTION OF THE INVENTION

The process of this invention can be utilized to modify virtually any type of rubbery elastomer. The rubbers which are modified in accordance with this invention typically contain conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The rubbery elastomer can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

The rubbers which are modified by the process of this invention must be epoxidized. Epoxidized rubbers can be prepared by utilizing numerous procedures any of which are suitable for preparing the epoxidized rubber utilized in the process of this invention. For instance, rubbers can be epoxidized with any of a number of peroxides, such as perbenzoic acid or performic acid. Rubbers are typically epoxidized in an organic solvent or latex. The organic solvent utilized will normally be a paraffinic or cycloparaffinic compound. Such solvents will normally contain from about 4 to about 10 carbon atoms per molecule and will be liquids under the conditions of the epoxidization reaction. Some representative examples of suitable solvents include pentane, isooctane, normal-hexane, cyclohexane, normal-heptane, and the like, alone or in admixture. The epoxidization reaction will generally be carried out at a temperature which is within the range of about −10° C. to about 80° C. The epoxidization will preferably be carried out at a temperature which is within the range of about 15° C. to about 45° C. For the sake of convenience, the epoxidization will normally be carried out at ambient temperature which will generally be within the range of about 20° C. to about 25° C. Some representative examples of peracids which can be utilized to epoxidize the rubber include performic acid, peracetic acid, perpropanoic acid, perbutanoic acid, 2-methylperpropanoic acid, perpentanoic acid, perpalmitic acid, perstearic acid, chloroperacetic acid, dichloroperacetic acid, trichloroperacetic acid, trifluoroperacetic acid, 2-chloroperbutanoic acid, 3-chloroperbutanoic acid, 4-chloroperbutanoic acid, methoxyperacetic acid, perbenzoic acid, meta-chloroperbenzoic acid, phenylperacetic acid, and the like. The peroxidization of the rubber can be carried out by simply adding the peracid to the rubber cement. In the alternative, the reaction can be performed by adding hydrogen peroxide and a carboxylic acid separately to the rubber cement to generate the peracid in situ. The epoxidization reaction is stereospecific. That is, a trans-microstructure in the rubber produces a trans-epoxide with the cis-microstructure in the polymer producing cis-epoxides. Excess peracids and acid decomposition byproducts, which remain after the epoxidization reaction has been completed, can be stripped from the rubber cement, such as by volatilization, or can be neutralized with a base, such as sodium hydroxide.

It will normally not be necessary to epoxidize more than about 40% of the double bonds in the rubber utilized in preparing the rubber compositions of this invention. In most cases, it will be preferred to epoxidize from about 0.05 to about 10% of the double bonds in the rubber. It is generally desirable to minimize the amount of epoxidization to prevent the unnecessary alteration of rubber properties. Accordingly, it is generally most preferred to epoxidize only from about 0.1% to about 2% of the double bonds present in the rubber.

The rubber compositions of this invention are prepared by simply reacting the epoxidized rubber with a nylon. This is accomplished by simply mixing the nylon homogeneously throughout the epoxidized rubber and heating the nylon/epoxidized rubber blend. Normally, such blends will be prepared by mixing from about 2 phr to about 55 phr (parts per hundred parts of rubber) of nylon throughout the rubber. This can be accomplished using conventional mixing techniques. For example, the mixing can be carried out in a Banbury mixer or a mill mixer. In most cases, it will be preferred to utilize from about 10 phr to about 50 phr of nylon in the blend. It will be typically more preferred to utilize from about 20 phr to about 45 phr of nylon in the blend. After the nylon/epoxidized rubber blend has been prepared, it can be simply heated to a temperature which is within the range of about 140° C. to about 300° C. to produce the rubber compositions of this invention. The nylon will preferably be reacted with the epoxidized rubber at a temperature which is within the range of about 160° C. to about 270° C. It will generally be most preferred to carry out the reaction between the nylon and epoxidized rubber at a temperature which is within the range of about 170° C. to about 250° C. The preferred reaction temperature will generally be slightly above the melting point of the nylon being utilized. For example, nylon 12 has a melting point of about 179° C. and in cases where it is utilized, a reaction temperature within the range of about 185° C. to about 195° C. is most preferred.

Virtually any type of nylon can be utilized in preparing the rubber compositions of this invention. These nylons are polyamides which can be prepared by reacting diamines with dicarboxylic acids. The diamines and dicarboxylic acids which are utilized in preparing such nylons will generally contain from about 2 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

The nylons which are preferred for utilization in the process of this invention have melting points which are within the range of about 150° C. to about 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of about 175° C. to about 210° C. Some representative examples of such highly preferred nylons include nylon-8, nylon-9, nylon-10, nylon-11 and nylon-12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cycloctane, oxidized to cycloctanone, converted to the oxime with hydroxylamine, and subjected to the Beckmann rearrangement. Nylon-8 has a melting point of 200° C.

Poly(ω-aminoundecanoic acid), known as nylon-11 can be prepared by the melt polymerization of ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst. ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckman rearrangement to yield the ω-dodecanolactam. Nylon-12 has a melting point of 179° C. and is very highly preferred for use as the nylon in the process of this invention.

The nylons used in the process of this invention will typically have number average molecular weight which is within the range of- about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with epoxidized rubbers and are accordingly preferred.

Nylons typically contain amine end groups. These amine end groups are believed to react with epoxide groups on the epoxidized rubber to form the rubber compositions of this invention. This reaction can be depicted as follows:

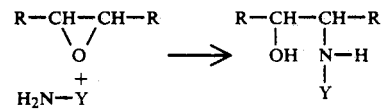

wherein R represents chains of the rubber and wherein Y represents chains of the nylon. As can be seen, the nylon chains are grafted onto the backbone of the rubbery polymer forming the rubber compositions of this invention.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLES 1-4

In Examples 1-3 rubber compositions were made utilizing epoxidized natural rubber. Example 4 was done as a control.

In this series of experiments epoxidized natural rubber was modified with 25 phr of various nylons. The epoxidized natural rubber used was 25 mole percent epoxidized. In other words 25% of the double bonds in the natural rubber were epoxidized. The grafting was carried out in a 280 gram preparative Brabender mixer which could be electrically heated. The epoxidized natural rubber was mixed with 25 phr of nylon pellets, 0.5 phr of thiodiphenylamine (phenothiazine), and 1.0 phr of a stabilizer at the beginning of the mix cycle. In Examples 1, 2 and 3, the nylon was mixed with the epoxidized natural rubber at 165° C., 190° C. and 175° C., respectively. Three different types of nylon were utilized in this series of experiments. The nylon utilized in Example 1 had a melting point of 131° C. The nylon utilized in Example 2 was nylon-12 and had a melting point of 179° C. and the nylon utilized in Example 3 had a melting point of 159° C. Example 4 was conducted as a control and did not include any nylon.

The rubber compositions made were compounded with 45 phr or carbon black, 9 phr of an oil, 2 phr of N-phenyl-N'-(1,3-dimethylbutyl)-p-phenylenediamine, 1 phr of diaryl-p-phenylene diamine, 1 phr of a wax, 3 phr of stearic acid, 3 phr of zinc oxide, 0.8 phr of N-oxydiethylene benzothiazole-2-sulfenamide, 0.4 phr of guanidine, and 1.6 phr of insoluble sulfur. The rubber compositions were then cured at 300° F. (149° C.) for 25 minutes. The 50% modulus, 100% modulus, tensile strength and elongation of the cured rubber samples made are reported in Table I.

TABLE I

| Example | 50% Modulus* | 100% Modulus* | Tensile Strength* | Elongation |
|---------|--------------|---------------|-------------------|------------|
| 1 | 3.0 | 5.5 | 11.4 | 210% |
| 2 | 5.5 | 11.0 | 16.0 | 160% |
| 3 | 3.5 | 7.0 | 16.0 | 250% |
| 4 | 1.2 | 2.4 | 7.0 | 240% |

*Given in Mega Pascals

As can be determined by reviewing Table I, very significant improvements in the modulus and tensile strength of the natural rubber were realized in the rubber compositions of this invention. For instance, in Example 2 a 50% modulus of 5.5 MPa was realized which is over 4 times as great as that attained in the control (Example 4). The rubber compositions made also had greatly improved tensile strength. For instance, the tensile strength of the rubber composition prepared in Example 3 was 16 MPa which compares very favorably with that of the control which was only 7 MPa. However, this modification procedure did not greatly effect the elongation of the natural rubber. For instance, examples 1, 2 and 3 had elongations which were comparable with those of the control (Example 4).

EXAMPLE 5

The procedure utilized in Examples 1-3 was repeated in this experiment except that the maximum mixing temperature utilized was 181° C. and the nylon utilized was acid capped for improved stability. In this experiment, the mixing time utilized was about 10 minutes. The rubber composition produced had a 50% modulus of 6.1 MPa, a 100% modulus of 10.7 MPa, a tensile strength of 16.2 MPa, an elongation of 170%, a tan delta at 0° C. of 0.111 and a tan delta at 60° C. of 0.125. This example shows that acid capped nylons can be effectively utilized for modifying rubbers in accordance with this invention. It also shows that such rubber compositions have greatly increased modulus at low strain.

EXAMPLES 6-9

The procedure specified in Example 5 was repeated in this series of experiments except that 40 phr of nylon was utilized in modifying the epoxidized natural rubber. In Examples 6, 7, and 8 a mixing time of 7 minutes was utilized and in Example 9 a mixing time of 5 minutes was utilized. In Example 6, the maximum mixing temperature was 188° C., in Example 7, the maximum mixing temperature was 184° C., in Example 8, the maximum mixing temperature was 174° C., and in Example 9, the maximum mixing temperature was 176° C. The 50% modulus, tensile strength, and elongation for the rubber compositions prepared in this series of experiments is shown in Table II.

TABLE II

| Example | 50% Modulus* | Tensile Strength* | Elongation |
|---------|--------------|-------------------|------------|
| 6 | 7.6 | 18 | 170% |
| 7 | 7.0 | 18 | 180% |
| 8 | 5.7 | 21 | 250% |
| 9 | 6.5 | 18.4 | 180% |

*Given in Mega Pascals

This series of experiments shows that the modulus at low strains can be further increased by modifying the epoxidized natural rubber with greater amounts of nylon. For instance, in Example 6 a 50% modulus of 7.6 MPa was realized. However, it should be noted that the modification of rubbers with large amounts of nylon causes the rubber composition to lose some of its elasticity. It is accordingly not desirable to modify rubbers with greater than about 55 phr of nylon.

EXAMPLES 10-12

The procedure utilized in Examples 1-3 was repeated in this series of experiments except that an epoxidized synthetic polyisoprene was utilized in place of the epoxidized natural rubber used in Examples 1-3. The nylon utilized in this experiment was acid capped. In Example 10, 45 phr of nylon was mixed into the rubber at 189° C. and in Example 11, 25 phr of nylon was mixed into the rubber at 195° C. Example 12 was conducted as a control and did not include any nylon. The samples made were compounded and cured as described in Examples 1-4. The 50% modulus, 100% modulus, tensile strength and elongation of the samples made are reported in Table III.

TABLE III

| Example | 50% Modulus* | 100% Modulus* | Tensile Strength* | Elongation |
|---------|--------------|---------------|-------------------|------------|
| 10 | 6.9 | 12.5 | 15.2 | 120% |
| 11 | 3.3 | 6.4 | 15.3 | 210% |
| 12 | 1.0 | 1.9 | 15.4 | 410% |

*Given in Mega Pascals

Very significant improvements in the modulus while maintaining the tensile strength of the polyisoprene rubber were realized in Examples 10 and 11. For example, in Example 10 a 50% modulus of 6.9 MPa was realized which is almost 7 times as great as that attained in Example 12 (the control).

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubber composition having a high modulus which comprises reacting at least one epoxidized rubber which is derived from a conjugated diene monomer and/or a nonconjugated diene monomer with from about 2 phr to about 55 phr of at least one nylon at a temperature which is within the range of about 140° C. to about 300° C.

2. A process as specified in claim 1 wherein the epoxidized rubber is less than about 40 mole percent epoxidized.

3. A process as specified in claim 2 wherein from about 10 phr to about 50 phr of at least one nylon is present.

4. A process as specified in claim 3 wherein said temperature is within the range of about 160° C. to about 270° C.

5. A process as specified in claim 4 wherein said epoxidized rubber is selected from the group consisting of epoxidized polybutadiene, epoxidized styrene-butadiene rubber, epoxidized natural rubber, epoxidized synthetic polyisoprene, epoxidized isoprene butadiene rubber, epoxidized carboxylated nitrile rubber, and epoxidized ethylene-propylene-diene monomer rubber.

6. A process as specified in claim 5 wherein the epoxidized rubber is less than about 10% epoxidized.

7. A process as specified in claim 6 wherein said nylon has a melting point which is within the range of about 150° C. to about 255° C.

8. A process as specified in claim 7 wherein said temperature is within the range of about 170° C. to about 250° C.

9. A process as specified in claim 8 wherein from about 20 phr to about 45 phr of at least one nylon is present.

10. A process as specified in claim 9 wherein the epoxidized rubber is epoxidized natural rubber.

11. A process as specified in claim 10 wherein the nylon is nylon-12.

12. A process as specified in claim 11 wherein the nylon-12 is acid terminated.

13. A process as specified in claim 11 wherein the nylon-12 has at least some amine end groups.

14. A process as specified in claim 5 wherein the epoxidized rubber is from about 0.1 to about 2 mole percent epoxidized.

15. A process as specified in claim 9 wherein said epoxidized rubber i epoxidized synthetic polyisoprene.

16. The rubber composition made by the process specified in claim 1.

17. The rubber composition made by the process specified in claim 11.

18. A process as specified in claim 1 wherein the nylon has a melting point which is within the range of about 150° C. to about 255° C.

19. A process as specified in claim 4 wherein said nylon is selected from the group consisting of nylon-6,6, nylon-6, nylon-7, nylon-8, nylon-9, nylon-10, nylon-11, nylon-12 and nylon-6,12.

20. A process as specified in claim 5 wherein said nylon has a melting point which is within the range of about 175° C. to about 210° C.

21. A process as specified in claim 6 wherein said nylon is selected from the group consisting of nylon-8, nylon-9, nylon-10, nylon-11, and nylon-12.

22. A process as specified in claim 20 wherein said nylon has a number average molecular weight which is within the range of about 8,000 to about 40,000.

23. A process for preparing a rubber modified nylon composition which comprises reacting at least one epoxidized rubber which is derived from a conjugated diene monomer and/or a nonconjugated diene monomer with from about 100 phr to about 5000 phr of at least one nylon at a temperature which is within the range of about 140° C. to about 300° C.

* * * * *